United States Patent [19]

Martin

[11] Patent Number: 4,636,623

[45] Date of Patent: Jan. 13, 1987

[54] APPARATUS FOR READING A LINE MARKING

[75] Inventor: Hans Martin, Thalwil, Switzerland

[73] Assignee: Emhart Industries, Inc., Farmington, Conn.

[21] Appl. No.: 648,229

[22] Filed: Sep. 7, 1984

[30] Foreign Application Priority Data

Sep. 12, 1983 [CH] Switzerland .......................... 4945/83

[51] Int. Cl.$^4$ .............................................. G06K 7/00
[52] U.S. Cl. .................................... 235/436; 235/463; 235/470; 235/474
[58] Field of Search ............... 235/454, 436, 462, 463, 235/470, 474; 356/383

[56] References Cited

U.S. PATENT DOCUMENTS 3,428,817  2/1969  Hofmeister et al. ............ 356/383 X
3,588,452  6/1971  Kee ...................................... 235/454
3,780,270  12/1973  Faulkner et al. .
3,790,756  2/1974  Graves et al. .
4,070,584  1/1978  Chartraire et al. .
4,408,121  10/1983  Galatha ........................... 235/470 X

FOREIGN PATENT DOCUMENTS 2033120  5/1980  United Kingdom .

Primary Examiner—David L. Trafton
Attorney, Agent, or Firm—Arthur B. Moore; Arthur J. Samodovitz

[57] ABSTRACT

The apparatus comprises a reading surface which is formed by a plurality of photo-diodes. Each photo-diode is connected to an input of an AND-gate. The AND-gates each have another input which receives pulses from a scanner which distributes pulses to the inputs of the AND-gates in turn. The AND-gates are actuated in turn and, if the associated photo-diode is illuminated by the image of a marking element passes a signal to a counter. A decoder connected to the counter produces a signal indicating how many of the photo-diodes are illuminated and, thus, the length of the marking element.

14 Claims, 1 Drawing Figure

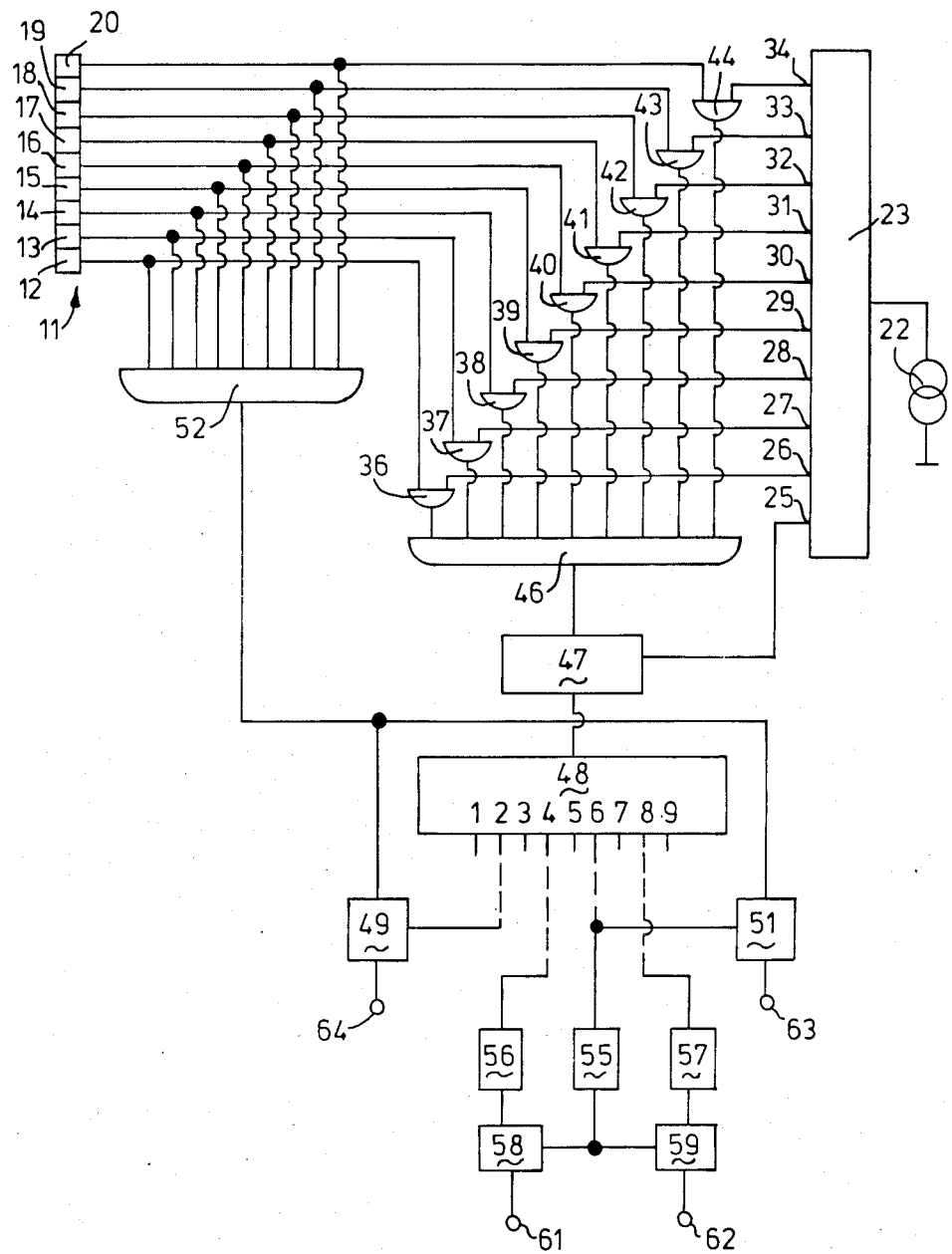

APPARATUS FOR READING A LINE MARKING

BACKGROUND OF THE INVENTION

This invention is concerned with apparatus for reading a line marking fixed to a carrier, the marking comprising a succession of line-like elements of differing lengths which are arranged substantially parallel to one another, the shorter elements being used as pulse generator markings and the longer elements as code symbols, the apparatus operating in conjunction with an optical apparatus which displays the elements in turn on a reading surface as the marking carrier is moved transversely to the direction in which the elements extend, the reading surface being divided into a plurality of sectors each of which is associated with an optoelectronic transducer which, when illuminated, produces an electrical output signal.

Various types of such apparatus are known for reading markings of various kinds. One of these types is designed for reading line markings, the line-like elements of which are formed in relief on the cylindrical wall or the bottom contraction of a container. The problems involved in reading such line markings and an apparatus which overcomes these problems are described in the specification of European Patent Application No. 0105715. This apparatus comprises an optical arrangement which displays the line-like elements in turn on a reading surface. The reading surface is divided into more than three consecutive sectors and a pulse signal indicating a shorter element is produced whenever an element is displayed on a sector. A pulse signal indicating a longer element is produced whenever an element is displayed simultaneously on at least two sectors which are separated from one another by at least one other sector. When using the apparatus described in said specification for reading the mould number in which glass or plastics containers have been moulded, each element of the marking has to be read within a time of less than 0.2 milliseconds. This is especially difficult if the individual elements are off-set relative to one another in their longitudinal direction, if their surface is imperfectly shaped, or if the container does not assume a vertical position in the rotating apparatus so that the marking is inclined to the reading plane.

The object of the present invention is to improve the apparatus described in the aforementioned patent specification to increase its accuracy.

BRIEF SUMMARY OF THE INVENTION

The invention provides apparatus for reading a line marking fixed to a carrier, the marking comprising a succession of line-like elements of differing lengths which are arranged substantially parallel to one another, the shorter elements being used as pulse generator markings and the longer elements as code symbols, the apparatus operating in conjunction with an optical apparatus which displays the elements in turn on a reading surface as the marking carrier is moved transversely to the direction in which the elements extend, the reading surface being divided into a plurality of sectors each of which is associated with an optoelectronic transducer which, when illuminated, produces an electrical output signal, wherein the apparatus comprises an electronic circuit comprising a plurality of AND-gates each having two inputs, a first of the inputs being connected to an associated one of the optoelectronic transducers of the reading surface, and a pulse generator having its output connected to a scanner which transmits the pulses in turn to a plurality of outputs, each output being connected to a second input of the AND-gates, and also comprising a first OR-gate having a plurality of inputs, wherein each input of the first OR-gate is connected to the output of one of the AND-gates, and comprising a counter having a counting input which is connected to the output of th first OR-gate and a re-setting input which is connected to an output of the scanner, the counter being followed next in the circuit by a decoder having a plurality of outputs, wherein a numerical value is associated with each output and, in each read-out, a signal appears at the output whose associated numerical value corresponds to the number of the optoelectronic transducers which are illuminated, and wherein the apparatus also comprises two pulse emitters whose signal inputs are each connectable to an associated output of the decoder and of which the one produces a pulse signal whenever the output signal of the decoder is equal to a pre-selectable first value and the other produces a code signal whenever the output signal of the decoder is equal to a pre-selectable second value, the second value being greater than the first.

An apparatus according to the last preceding paragraph can be used to read each element of a marking more than once, the number depending on the frequency of the pulse generator, so that the greater accuracy can be obtained.

The apparatus may also comprise a second OR-gate having a plurality of inputs, each input being connected to one of the optoelectronic transducers and the output of the second OR-gate being connected to re-setting inputs of the pulse emitters. This enables the pulse emitters to be de-energised between the passage of marking elements through the reading area.

The apparatus may also comprise three counters the input of one counter being connected to the same output of the decoder as the input of the pulse emitter which produces the code signals and the inputs of the other counters being connected to other outputs of the decoder, one of which is associated with a specific greater value and the other of which is associated with a specific smaller value than the aforementioned output, and two comparators, one input of each comparator being connected to the output of the first-mentioned counter and the other inputs of the comparators being respectively connected to the outputs of the other counters, the comparators having output lines for a marking-reading cancellation signal. This enables a permissible tolerance range to be established for the length of the marking elements and for a signal to be produced which interrupts the analysis of the code signals or pulse generator signals and a new read-out to be initiated whenever the number of measurements of length at either limit of the tolerance range exceeds the number of measurements having the expected length.

BRIEF DESCRIPTION OF THE DRAWING

The drawing is block circuit diagram of an apparatus in accordance with the invention. It is to be understood that the apparatus shown in drawing is described for the purposes of illustration of the invention and not of limitation thereof.

DETAILED DESCRIPTION OF PREFERRED EMBODIMENT OF THE INVENTION

The apparatus shown in the drawing is for reading a line marking fixed to a carrier, the marking comprising a succession of line-like elements of differing lengths which are arranged substantially parallel to one another. The shorter elements are used as pulse generator markings and the longer elements as code symbols indicating, for example, the mould in which the carrier was made. The apparatus comprises a reading surface 11 and operates in conjunction with an optical apparatus (not shown) which displays the elements in turn on the surface 11 as the carrier is moved transversely to the direction in which the elements extend. Where the marking is on a cylindrical container, the container is rotated about a vertical axis to display the elements.

The reading surface 11 is divided into a plurality of sectors, viz. nine, each of which is associated with a photo-diode 12 to 20 which provides an optoelectronic transducer which, when illuminated, produces an electrical output signal. The apparatus also comprises a pulse generator 22 which produces a symmetic series of pulses in which the duration of each pulse is equal to the interval between successive pulses. The output of the pulse generator 22 is connected to an input of a scanner 23 which has ten outputs 25 to 34. The scanner 23 operates to cause the pulses it receives to appear on its outputs in chronological order. Thus, the first pulse appears on the output 25, the second on the output 26 and so on with output 25 following output 34 in the sequence.

The apparatus also comprises a plurality, viz. nine, of AND-gates 36 to 44. Each of these AND-gates has two inputs, a first connected to an associated one of the photo-diodes 12 to 20 and a second connected to an associated one of the outputs 26 to 34 of the scanner 23. Each of these nine AND-gates has an output connected to an associated input of a first OR-gate 46 of the apparatus. The first OR-gate 46 thus has nine inputs and also has an output connected to a counting input of a first counter 47 of the apparatus. The counter 47 also has a re-setting input connected to the output 25 of the scanner 23.

The first counter 47 is followed next in the circuit by a decoder 48 of the apparatus. The decoder 48 has a plurality, viz. nine, of outputs and each of the outputs is associated with one of the photo-diodes 12 to 20. A numerical value is associated with each output, corresponding to a number of the associated photo-diodes, and, in each read-out, a signal appears on the output whose associated numerical value corresponds to the number of the photo-diodes 12 to 20 which are illuminated. Two selected outputs of the decoder 48 are connected to signal inputs of pulse emitters 49 and 51 of the apparatus. The emitter 49 produces a signal whenever the output signal of the decoder 48 is equal to the pre-selected first value corresponding to the value associated with the output to which the emitter 49 is connected. The emitter 51 likewise produces a signal whenever the output signal of the decoder is equal a pre-selected second value corresponding to the value associated with the output to which it is connected. The second value is greater than the first value.

Each of the wires connecting the photo-diodes 12 to 20 to the AND-gates 36 to 44 is connected by a secondary line to an associated input of a second OR-gate 52 which has an output connected by a divided line to re-setting signal inputs of the pulse emitters 49 and 51.

The particular output of the decoder 48 which is connected to the input of the pulse emitter 51 is also connected to the counting input of a second counter 55 of the apparatus. Two further outputs of the decoder, one associated with a smaller numerical value than the output connected to the pulse emitter 51 and the other associated with a greater numerical value, are connected respectively to a third counter 56 and to a fourth counter 57 of the apparatus.

The apparatus also comprises two comparators 58 and 59, both having one input connected to the output of the second counter 55 and a further input connected to the output of either the third counter 56 or the fourth counter 57, the further input of the comparator 58 being connected to the counter 56 and that of the comparator 59 being connected to the counter 57.

For the purposes of describing the operation of the apparatus, it will be assumed that, during read-out shorter elements of marking illuminate two photo-diodes 14 and 15 and longer elements illuminate six photo-diodes 14 to 19, it will be further assumed that the marking is read at a speed such that photo-diodes are illuminated for approximately 0.2 milliseconds with the interval between illuminations being approximately 0.3 milliseconds. The frequency of the pulse generator is assumed to be 500 kilo-Hertz to that at each of the outputs 25 to 34 of the scanner 23 a signal appears every 0.02 milliseconds lasting 1 microsecond.

If, under the presumed conditions, a longer element of the marking is moved through the reading area, the photo-diodes 14 to 19 are illuminated for approximately 0.2 milliseconds. The outputs of these photo-diodes actuate the AND-gates 38 to 43 for the same length of time so that the pulses appearing at the outputs 28 to 33 of the scanner 23 are passed to the first OR-gate 46. The counter 47, which is re-set after a cycle of the scanner, therefore counts six pulses ten times. The result of each count is retained in the decoder 48 upon re-setting of the counter. A signal, then, appears on the output 6 of the decoder 48 and is passed to the pulse emitter 51 which produces a signal on an output 63 thereof which is passed to an analysing circuit (not shown).

If the shorter element is moved through the reading area, then, under the presumed conditions, the photo-diodes 14 and 15 are illuminated and an output signal appears on the output 2 of the decoder 48. This output energises the pulse emitter 49 whose output can be utilised as a pulse generator marking.

The pulse emitters 49, 51 may conveniently be provided by flip-flops and operate so long as at least one of the photo-diodes 12 to 20 is illuminated so that an energising signal is sent to the pulse emitters via the second OR-gate 52. After an element of the marking has passed through the read-out area and during the intervals between the passage of successive elements, none of photo-diodes 12 to 20 is illuminated and the pulse emitters 49, 51 are not, therefore, activated.

If a longer element of the assumed type is imperfectly shaped or damaged, it is possible that not all the photo-diodes 14 to 19 will be illuminated for the whole 0.2 milliseconds during which the element passes through the read-out area. Consequently, the associated AND-gates 38 to 43 may not be open to pass pulses. In this case, signals appear not only at the output 6 of the decoder 48 but also, for example, at the outputs 4 and 8. The number of signals appearing at these outputs is counted into the counters 55, 56 or 57 and the counter readers are compared in the comparators 58 and 59. If the reading of one of the counters 56 and 57 which count the outputs 4 and 8 is greater than the reading of the counter 55, a fault signal appears on the output of the comparator 58 or 59. This fault signal is passed to the analysing circuit which cancels the output of one or other of the pulse emitters 49 and 51 and initiates a new read-out of the entire marking.

Only the length of an element of the marking is of significance in the apparatus described and a displacement of one or more elements in the longitudinal direction does not affect the analysis. It is to be understood that the connections between the decoder 48 and the pulse emitters 49 and 51 and the counters 55, 56 and 57 (which connections are shown in broken line) can be selected according to specific measuring requirements. Furthermore, the same control circuit, which has been described for reading longer elements and is made up of the counters 55, 56 and 57 and of the comparators 58 and 59, can be used for reading shorter elements or alternatively two control circuits can be used. The higher the frequency of the pulse generator 22, the more readings of each element can be obtained giving increased value to the analysis. It is possible to use a microprocessor in substitution for the components described in suitable circumstances.

I claim:

1. Apparatus for reading a line marking fixed to a carrier, the marking comprising a succession of line-like elements of at least two different lengths which are arranged substantially parallel to one another, the apparatus operating in conjunction with an optical apparatus which displays the line-like elements in turn on a reading surface as the marking carrier is moved transversely to the direction in which the elements extend, the reading surface being divided into a plurality of sectors each of which is associated with an optoelectronic transducer which, when illuminated, produces an electrical output signal, wherein the apparatus comprises an electronic circuit comprising a plurality of AND-gates each having two inputs, a first of the inputs being connected to an associated one of the optoelectronic transducers of the reading surface, a pulse generator scanner means receiving pulses from said pulse geneartor for transmitting the pulses in turn to each second input of the AND-gates, a first OR-gate having a plurality of inputs, wherein each input of the first OR-gate is connected to the output of one of the AND-gates, a counter having a counting input which is connected to the output of the first OR-gate and a resetting input which is connected to an output of the scanner means, a decoder coupled to the output of the counter and having a plurality of outputs, wherein a numerical value is associated with each output and, in each read-out, a signal appears at the output whose associated numerical value corresponds to the number of the optoelectronic transducers which are illuminated, a first counter having an input connected to one of the outputs of the decoder which decoder output corresponds to an accurate measurement of one of the line lengths, second and third counters having respective inputs connected to other outputs of the decoder, one of which is associated with a specific greater value count and the other of which is associated with a specific smaller value count than the aforementioned output, and two comparators, one input of each comparator being connected to the output of the first counter and the other inputs of the comparators being respectively connected to the outputs of the second and third counters, whereby the comparators indicate a marking-reading error signal based on the comparison of said second and third counter outputs to the first counter output.

2. Apparatus according to claim 1, wherein the apparatus also comprises a second OR-gate having a plurality of inputs, each input being connected to one of the optoelectronic transducers and the output of the second OR-gate being connected to re-setting inputs of the pulse emitters.

3. An apparatus for reading a line marking fixed to a carrier, the marking comprising a succession of line-like elements of at least two different lengths which are arranged substantially parallel to one another, the apparatus operating in conjunction with an optical apparatus which displays the line-like elements in turn on a reading surface as the marking carrier is moved transversely to the direction in which the elements extend, the reading surface being divided into a plurality of sectors each of which is associated with an optoelectronic transducer which, when illuminated, produces an electrical output signal, wherein the apparatus comprises an electronic circuit comprising:

a plurality of AND-gates each having two inputs, a first of each input being connected to receive the output from an associated one of the optoelectronic transducers of the reading surface, pulse sequencing means for transmitting pulses in turn to the second inputs of said AND-gates to read the outputs of said optoelectronic transducers, said pulse sequencing means having a high enough pulse frequency to yield a plurality of scans of each line, first counter means for counting the number of optoelectronic transducers which are activated during each scan of each line, second counter means for determining the number of scans of each line in which the first counter means indicates a count level within a specific range associated with one of said line lengths, and third counter means for determining the number of scans of each line in which the first counter means indicates a count level outside of said specific range associated with said one line length and outside of a specific range associated with lines of the other length, said third counter means indicating erroneous readings.

4. An apparatus as set forth in claim 3 further comprising:

means coupled to said second counter means and said third counter means for determining when the number counted by said second counter means is high enough and the number counted by said third counter means is low enough to indicate an acceptable reading.

5. An apparatus as set forth in claim 3 further comprising:

decoding means having an input connected to the output of said first counter means and having outputs connected to the inputs of said second and third counter means for producing a signal at one of its outputs after each scan indicative of the numerical value of said first counter means.

6. An apparatus as set forth in claim 5 further comprising:
a first comparator having one input connected to the output of said second counter means and the other input connected to the output of said third counter means whereby said comparator yields indicia of an acceptable reading when the numerical value of said second counter means exceeds the numerical value of said third counter means.

7. An apparatus as set forth in claim 5 further comprising:
fourth counter means for determining the number of scans of each line in which the first counter means indicates a count level which is lower than said specific range and outside the range associated with lines of the other length, and wherein
said third counter means indicates the number of scans of each line in which the first counter means indicates a count level above said specific range.

8. An apparatus as set forth in claim 3 further comprising:
fourth counter means for determining the number of scans of each line in which the first counter means indicates a count level which is lower than said specific range and outside the range associated with lines of the other length, and wherein
said third counter means indicates the number of scans of each line in which the first counter means indicates a count level higher than said specific range.

9. An apparatus as set forth in claim 3 wherein said first counter means includes:
a first OR-gate having a plurality of inputs connected to the outputs of said AND-gates, and
a counter having a count input connected to the output of said first OR-gate and a re-setting input timed with the cycling of the pulse sequencing means.

10. An apparatus as set forth in claim 8 further comprising:
a first comparator having one input coupled to the output of said second counter means and the other input coupled to the output of said third counter means, and
a second comparator having one input coupled to the output of said second counter means and the other input coupled to the output of said fourth counter means whereby said comparators indicate an acceptable reading when the numerical value of said second counter means exceeds the numerical value of said third counter means and said fourth counter means.

11. An apparatus for reading a line marking fixed to a carrier, the marking comprising a succession of line-like elements of at least two different lengths which are arranged substantially parallel to one another, the apparatus operating in conjunction with an optical apparatus which displays the line-like elements in turn on a reading surface as the marking carrier is moved transversely to the direction in which the elements extend, the reading surface being divided into a plurality of sectors each of which is associated with an optoelectronic transducer which, when illuminated, produces an electrical output signal, wherein the apparatus comprises an electronic circuit comprising:
a plurality of AND-gates each having two inputs, a first of each input being coupled to the output of an associated one of the optoelectronic transducers of the reading surface,
pulse sequencing means for transmitting pulses in turn to the second inputs of said AND-gates to read the outputs of said optoelectronic transducers, said pulse sequencing means having a high enough pulse frequency to yield a plurality of scans of each line,
first counter means coupled to the outputs of said AND-gate for counting the number of optoelectronic transducers which are activated during each scan of each line, and
second counter means for determining the number of scans of each line in which the first counter means indicates a count level within a specific range associated with one of said line lengths.

12. An apparatus as set forth in claim 11 further comprising:
means coupled to said second counter means for determining when the number counted by said second counter means is high enough to indicate an acceptable reading of said one line length.

13. An apparatus for reading a line marking fixed to a carrier, the marking comprising a succession of line-like elements of at least two different lengths which are arranged substantially parallel to one another, the apparatus operating in conjunction with an optical apparatus which displays the line-like elements in turn on a reading surface as the marking carrier is moved transversely to the direction in which the elements extend, the reading surface being divided into a plurality of sectors each of which is associated with an optoelectronic transducer which, when illuminated, produces an electrical output signal, wherein the apparatus comprises an electronic circuit comprising:
first counter means for counting the number of optoelectronic transducers which are activated during each scan of each line,
second counter means for determining the number of scans of each line in which the first counter means indicates a count level within a specific range associated with one of said line lengths, and
third counter means for determining the number of scans of each line in which the first counter means indicates a count level outside of said specific range associated with said one line length and outside of a specific range associated with lines of the other length, said third counter means indicating erroneous readings.

14. An apparatus as set forth in claim 13 further comprising:
means coupled to said second counter means and said third counter means for determining when the number counted by said second counter means is high enough and the number counted by said third counter means is low enough to indicate an acceptable reading.

* * * * *